(12) United States Patent
Loretan

(10) Patent No.: US 9,467,730 B2
(45) Date of Patent: Oct. 11, 2016

(54) REMOTE CONTROL

(71) Applicant: Comcast Cable Communications, LLC, Philadelphia, PA (US)

(72) Inventor: Tom Loretan, Trumbull, CT (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 436 days.

(21) Appl. No.: 14/044,482

(22) Filed: Oct. 2, 2013

(65) Prior Publication Data
US 2015/0091710 A1 Apr. 2, 2015

(51) Int. Cl.
G08C 19/16 (2006.01)
H04N 21/422 (2011.01)
G08C 17/02 (2006.01)
G06F 3/02 (2006.01)
H04N 5/44 (2011.01)

(52) U.S. Cl.
CPC ...... *H04N 21/42224* (2013.01); *G06F 3/0202* (2013.01); *G08C 17/02* (2013.01); *H04N 5/44* (2013.01); *G08C 2201/30* (2013.01); *H04N 5/4403* (2013.01); *H04N 2005/4432* (2013.01)

(58) Field of Classification Search
None
See application file for complete search history.

(56) References Cited

U.S. PATENT DOCUMENTS

| | | | | |
|---|---|---|---|---|
| 4,246,552 A * | 1/1981 | Fukasawa | ............... | H01P 1/387 333/1.1 |
| 5,430,262 A * | 7/1995 | Matsui | ................. | H01H 25/041 200/11 R |
| 6,344,618 B1 * | 2/2002 | Sato | ..................... | H01H 25/041 200/6 A |
| 6,344,619 B1 * | 2/2002 | Yamasaki | ............ | H01H 25/041 200/6 A |
| 6,844,511 B1 * | 1/2005 | Hsu | ....................... | H01H 25/041 200/5 R |
| 7,091,430 B1 * | 8/2006 | Haizima | ............... | G06F 3/0338 200/4 |
| 7,557,318 B2 * | 7/2009 | Osada | .................... | H01H 13/12 200/314 |
| 7,910,843 B2 * | 3/2011 | Rothkopf | ............ | G06F 3/03547 200/4 |
| 2003/0057124 A1 * | 3/2003 | White | ................... | B65H 75/06 206/388 |
| 2004/0026220 A1 * | 2/2004 | Inoue | ................... | H01H 13/785 200/6 A |
| 2004/0226810 A1 * | 11/2004 | Takata | ................. | H01H 25/008 200/339 |
| 2005/0224321 A1 * | 10/2005 | Yamasaki | ............ | H01H 25/041 200/6 A |
| 2006/0278512 A1 * | 12/2006 | Sawada | ................. | G06F 3/0338 200/329 |
| 2008/0237023 A1 * | 10/2008 | Kazama | ............... | H01H 25/041 200/6 A |
| 2010/0140070 A1 * | 6/2010 | Simard | ................. | G04C 23/347 200/33 R |
| 2011/0073457 A1 * | 3/2011 | Kishimoto | ........... | H01H 25/041 200/5 A |

* cited by examiner

Primary Examiner — Ojiako Nwugo
(74) Attorney, Agent, or Firm — Banner & Witcoff, Ltd.

(57) ABSTRACT

A handheld remote control device may have an angled directional control pad having a planar orientation that is askew from a front face control surface of the remote control device. The angled directional control pad may include a rear portion on the rear of the remote control device, which may be angled as well. The rear portion of the directional control pad may include an inductive charging circuit for charging a battery of the remote control device, and may be configured to mate with a charging base.

21 Claims, 14 Drawing Sheets

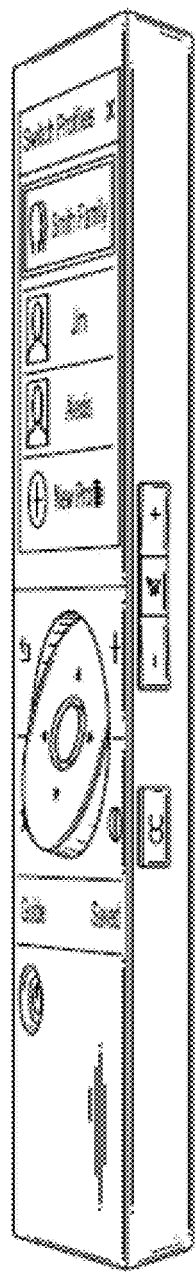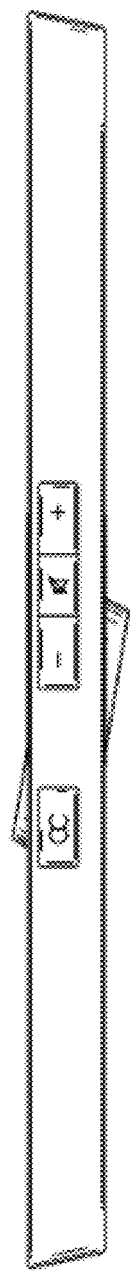
FIG. 4C
FIG. 4D

REMOTE CONTROL

BACKGROUND

Remote control devices, such as those used for controlling a television or digital video recorder (DVR), are the primary means through which many users interact with devices. Accessibility and ease of use are significant factors in defining a successful remote control. There remains an ever-present need for improvements in these areas.

SUMMARY

The following summary is for illustrative purposes only, and is not intended to limit or constrain the detailed description.

Features herein relate to an apparatus, such as a remote control device, having a directional control pad that, when in a resting state, is tilted with respect to a front face of the apparatus. For example, the front face of the apparatus may have a control surface arranged in a first plane, and the directional pad's up, down, left and right directional input locations may form a second plane that is at an offset angle with respect to the first plane. The directional control pad may be tilted at an angle of twenty (20) degrees with respect to the first plane, for example, although that tilt angle may be configured by the user as well.

When viewed from the left or right side of the apparatus, the directional control pad may have a portion with one of its directional input locations obscured from view, while a portion with another one of its directional input locations visible. For example, the portion of the directional control pad having an up directional input location may be recessed into the front face of the apparatus, while another portion having a down directional input location may protrude from the front face of the apparatus.

The directional control pad may have a disk-shaped appearance, and may include a rear portion that allows the directional control pad to give the appearance of a single disk tilted in the apparatus body. The front and rear faces of the directional control pad may be parallel, and each may be offset from the front and rear planes of the apparatus by the same offset angle.

The apparatus may be weighted such that its center of gravity lies within the area of the directional control pad. The apparatus may be accompanied by a charging base, which may have an upper surface configured to mate with the rear portion of the directional control pad, and the apparatus may rest atop the charging base. The charging base and apparatus may have inductive charging circuitry to allow the batteries of the apparatus to be inductively charged by the charging base. In some embodiments, the rear portion of the directional control pad may also include one or more magnetic couplings to secure the apparatus to the base while charging. In alternative embodiments, the charging base may charge the apparatus batteries through wire contacts instead of wireless induction.

In some embodiments, the apparatus may include a touch-sensitive display located above the tilted directional control pad.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 4A-G illustrate alternative views of the remote control illustrated in FIG. 3.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
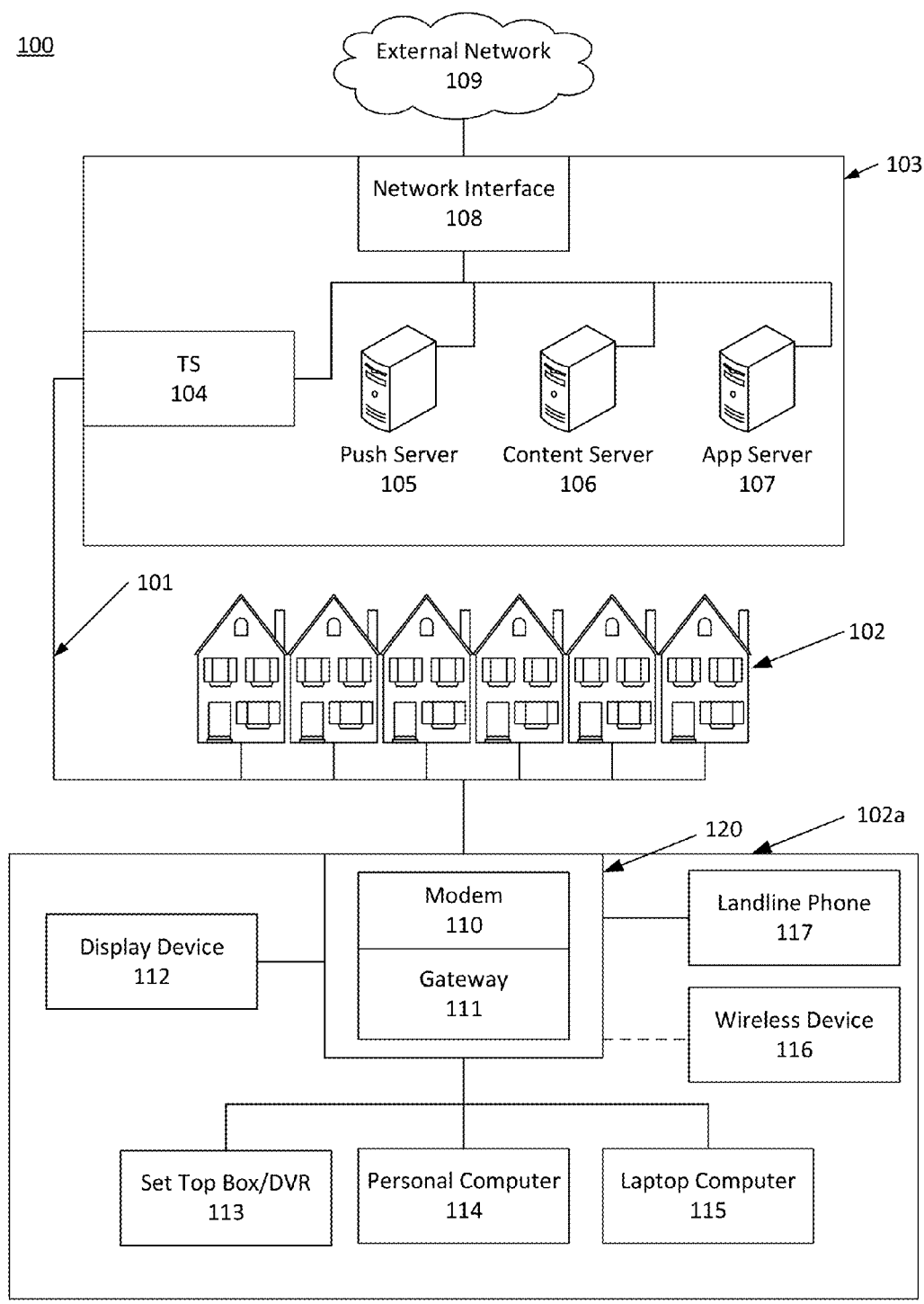
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices 105-107, such as servers, that may be configured to perform various functions. For example, the local office 103 may include a push notification computing device 105. The push notification device 105 may generate push notifications to deliver data and/or commands to the various premises 102 in the network (or more specifically, to the devices in the premises 102 that are configured to detect such notifications). The local office 103 may also include a content server computing device 106. The content device 106 may be one or more computing devices that are configured to provide content to users at their premises. This content may be, for example, video on demand movies, television programs, songs, text listings, etc. The content device 106 may include software to validate user identities and entitlements, to locate and retrieve requested content, to encrypt the content, and to initiate delivery (e.g., streaming) of the content to the requesting user(s) and/or device(s). Indeed, any of the hardware elements described herein may be implemented as software running on a computing device.

The local office 103 may also include one or more application server computing devices 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push device 105, content device 106, and application server 107 may be combined. Further, here the push device 105, content device 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
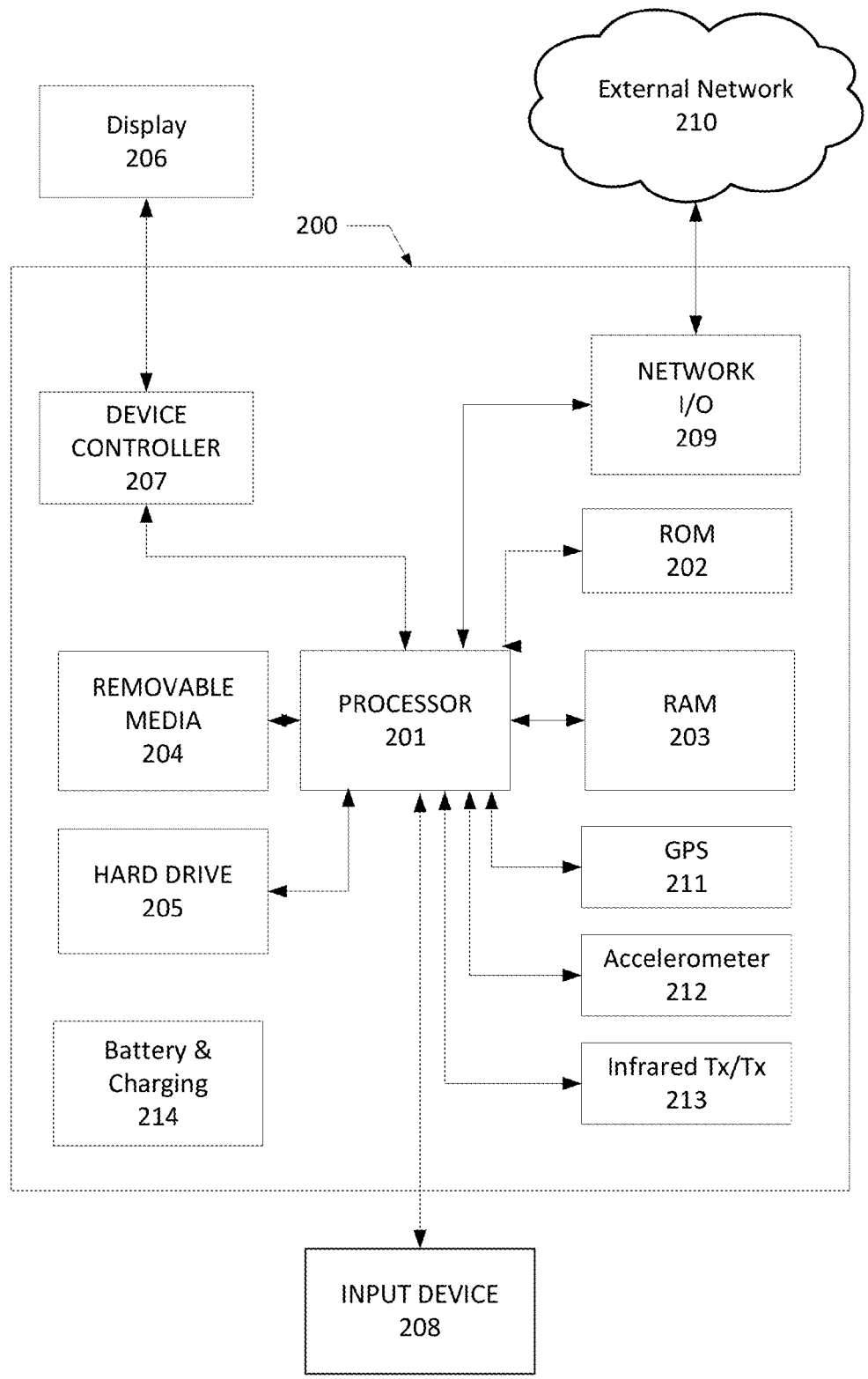
FIG. 2 illustrates an example computing device that can be used to implement any of the methods, servers, entities, and computing devices described herein.

FIG. 2 illustrates general elements that can be used to implement any of the various computing devices discussed herein, including an example handheld remote control. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television, a computer display, a remote control display, a touch-sensitive display, etc.), and may include one or more output device controllers 207, such as a video processor. There may also be one or more user input devices 208, such as a remote control, keyboard, mouse, touch screen, microphone, etc. When implemented as a handheld remote control, the input devices 208 may be the field of push buttons, the touch-sensitive display, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The computing device may also include an accelerometer 212 circuit, which may provide signals indicating movement of the device. The circuit may also include a gyroscope to indicate positioning, and a compass.

The computing device may also include an infrared transmission and reception circuit 213, which can be used to transmit or receive infrared signals, for example, when used as a handheld remote control to control a user's television or digital video recorder (DVR), or for local data exchanges with other infrared-equipped devices.

The computing device may also be equipped with an internal rechargeable battery 214, which may also include charging circuitry for recharging the battery. The charging circuitry may be, for example, inductive charging circuitry allowing the battery to be recharged when moved in proximity to an inductive charging base or other electromagnetic field.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein. The various computing devices, servers and hardware described herein may be implemented using software running on another computing device.

Figure 3:
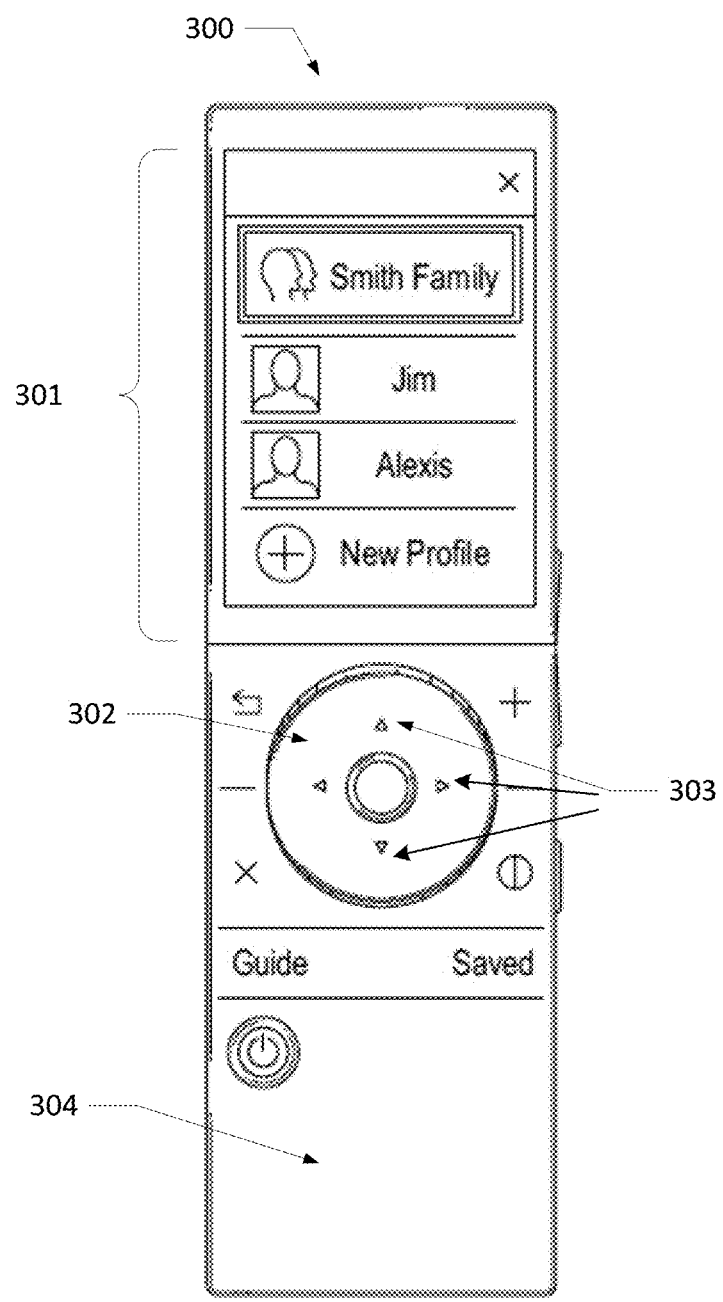
FIG. 3 illustrates an example remote control embodiment described herein.

As noted above, features herein relate generally to a handheld remote control device usable for controlling a user's television, set-top box, digital video recorder, computer, media player (e.g., DVD, CD, Blu-Ray, etc.), or other device. FIG. 3 illustrates an example front face of such a handheld remote control device 300. In the illustrated example, the remote 300 may include a touch-sensitive display area 301, which can present user interface information and controls to the user. In the depicted example screen, the remote permits users to select a user profile for the remote control, and the behavior of the remote (e.g., its display of commands, options, etc.) may be customized based on the preferences of the selected user profile.

Below the touch-sensitive display area 301, the remote 300 may include a directional control pad 302. The directional control pad 302 may include directional input locations 303 corresponding to the UP, DOWN, LEFT and RIGHT directions, which the user may touch or press to provide the corresponding directional user input command when navigating onscreen elements. The input locations can be physical buttons or touch-sensitive buttons, or they may correspond to physical or touch-sensitive buttons located underneath the directional control pad 302, whereby movement of the directional control pad 302 in response to a user pressing one of the directions may result in the pad pressing a corresponding button located underneath the directional control pad 302. Four directions are described in the above example, but the directional control pad 302 may include more directions, such as eight (UP, UP-RIGHT, RIGHT, RIGHT-DOWN, DOWN, DOWN-LEFT, LEFT and LEFT-UP).

In the illustrated example, the directional control pad 302 has a circular shape when viewed from the front of the device. Directional references to the device's front, rear, left, right, top and bottom are made with respect to the view shown in FIG. 3. The front of the device is shown in FIG. 3, the right, bottom, left and top sides are visible as edges, and the rear of the device is not visible in FIG. 3.

The remote 300 may also include other buttons on its front face. For example additional buttons 303 are shown in the FIG. 3 view.

Figure 4A:
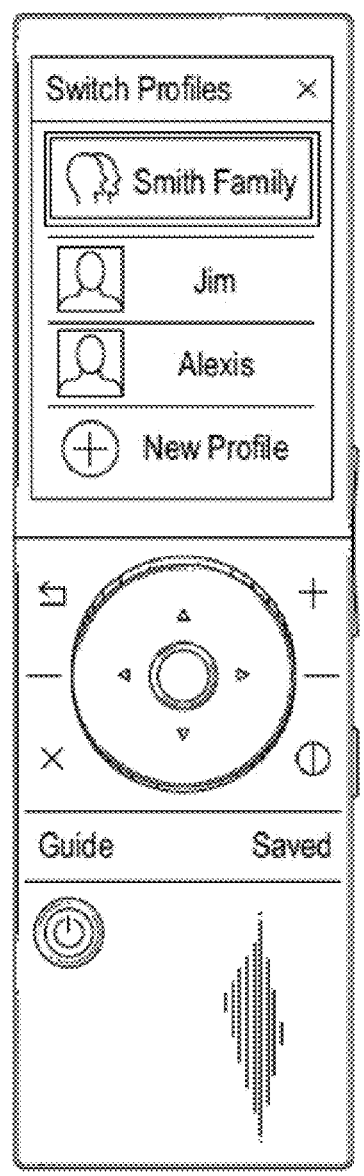
Figure 4B:
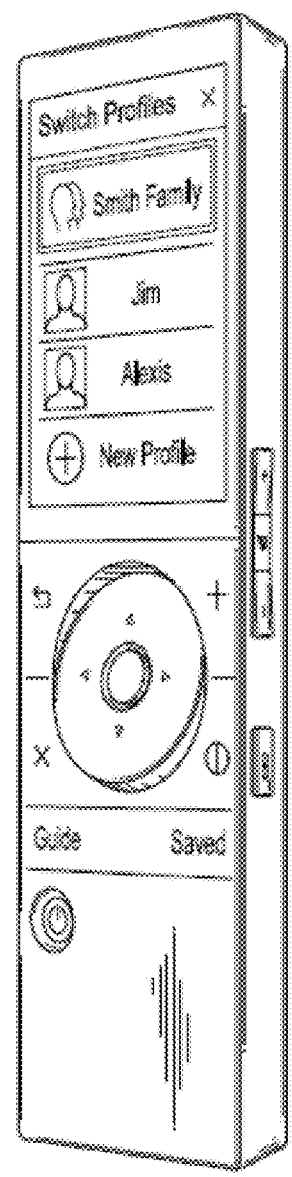

FIGS. 4A-G show the remote 300 from a variety of viewing angles. FIG. 4A is the same view as shown in FIG. 3. FIG. 4B shows a view of the front face and right face. As can be seen in FIG. 4B, the right face of the remote 300 may include additional buttons, such as volume control buttons. FIG. 4C shows a more rotated view of the front and right faces of the remote 300. FIG. 4D shows a view of the right-side face of the remote 300.

Figure 4E:
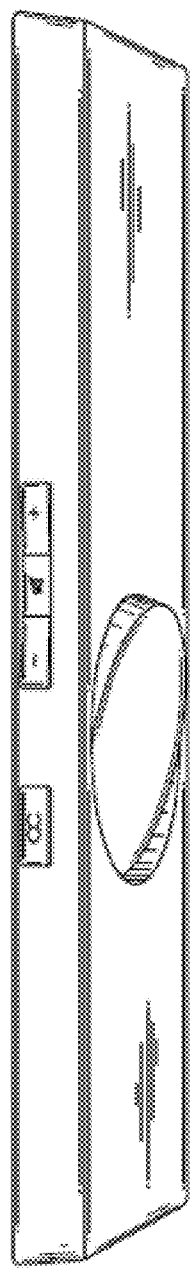
Figure 4F:
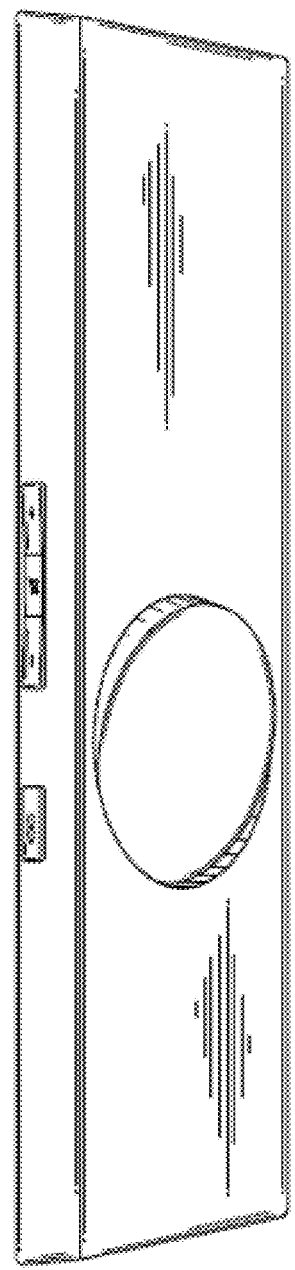
Figure 4G:
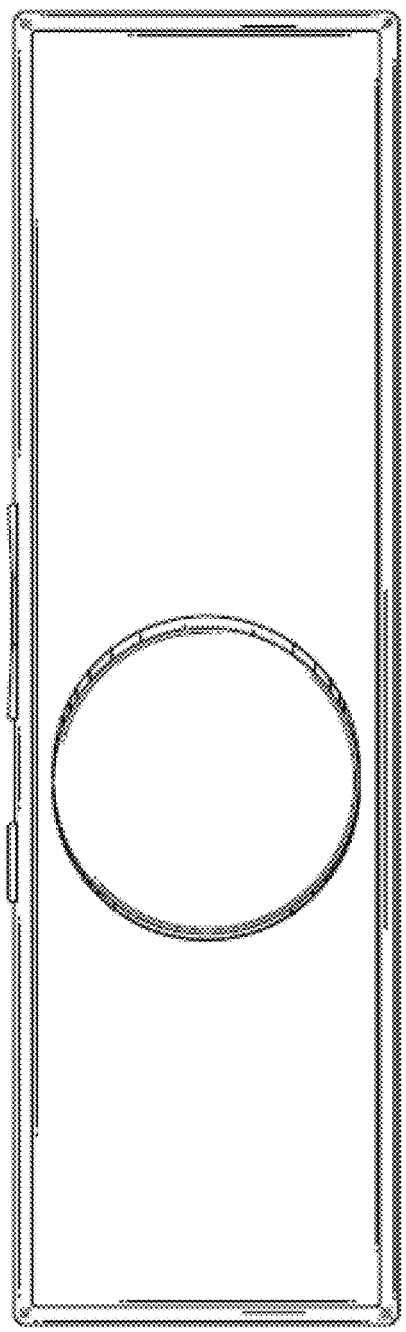

FIG. 4E illustrates a view showing the right face and rear of the remote 300, and FIG. 4F illustrates a more rotated view of the remote showing the same right face and rear. FIG. 4G illustrates a rear view of the remote 300.

As is evident from the FIGS. 4A-G, the directional control pad 302 is tilted with respect to the rest of the remote 300. A plane formed by the UP, DOWN, LEFT and RIGHT directional input locations of the directional control pad 302 (when no directions are being pressed by the user, when the device is in a resting state) is tilted with respect to a plane formed by the front face of the remote 300. In some embodiments, the plane formed by the front face of the remote 300 may be measured with respect to the display 301, the additional buttons 303, other areas 304 of the front face of the remote 300, or any combination of these elements.

Figure 5A:
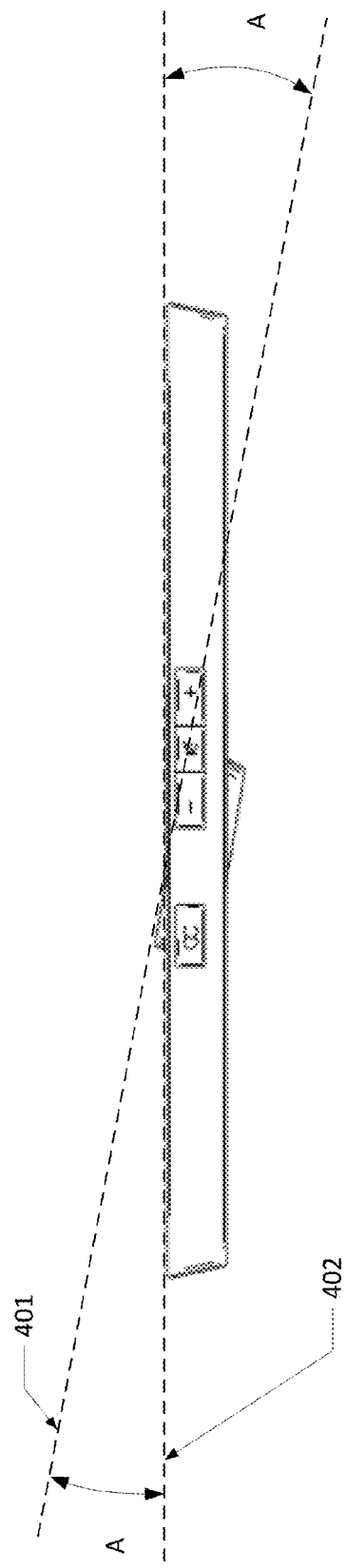
FIGS. 5A-C illustrate side views of the remote control illustrated in FIG. 3.

The angle of the tilting of the control pad 302 when it is in a resting position (e.g., a default angle of tilt) is visible in FIG. 5A. As illustrated, the angle A may be measured as an angle formed between a plane 401 of the directional control pad 302 and the plane 402 formed by the front face of the remote 300. In some embodiments, this angle of tilt may be twenty (20) degrees. In other embodiments, this angle may be any angle between 15 and 30 degrees. In some embodiments, the directional control pad 302 may be adjustable by the user to vary the angle of tilt. For example, the directional control pad 302 may include a tilting base attached to an axle in the left-right direction (with reference to FIG. 4A), and the base may be configured to stop in one or more predetermined angular tilted positions through the use of detents or any other desired positioning mechanism. For example, the directional control pad 302 may click as the user adjusts the degree A of tilt. To prevent accidental adjustment during use, the control pad may be configured to require a large amount of force to change the base angle of tilt, or a locking mechanism or pin may be used to hold the base at a desired angle of default tilt A. In the preceding discussion, the angle A is measured with respect to an up/down axis of the remote 300 (up/down with respect to orientation shown in FIG. 4A). In alternative embodiments, the default angle of tilt may be adjusted in other axes as well. For example, the base may allow the default angle to be tilted to the left or right (again, with respect to the orientation shown in FIG. 4A), rotating about an up/down axis of the remote 300.

As illustrated in the right-side view of FIG. 5A, the tilting results in a portion of the directional control pad 302 being visible from the side, and another portion being obscured from view from the side. In the FIG. 5A view, the portion of the directional control pad 302 that contained the UP button or input location is obscured by the body housing of the device, but the portion that contained the DOWN button or input location protrudes in a frontward direction from the front face, and is visible from the side of the device. The tilted base portion of the directional control pad 302 may similarly protrude from the rear surface of the device in a rearward direction, and may have one end (e.g., under the DOWN directional input location on the directional control pad) that is obscured, and another end (e.g., under the UP directional input location on the directional control pad) that is visible, from the side. In such a configuration, the portion of the base portion under the DOWN direction of the directional control pad may be recessed into the rear surface of the device.

Figure 5B:
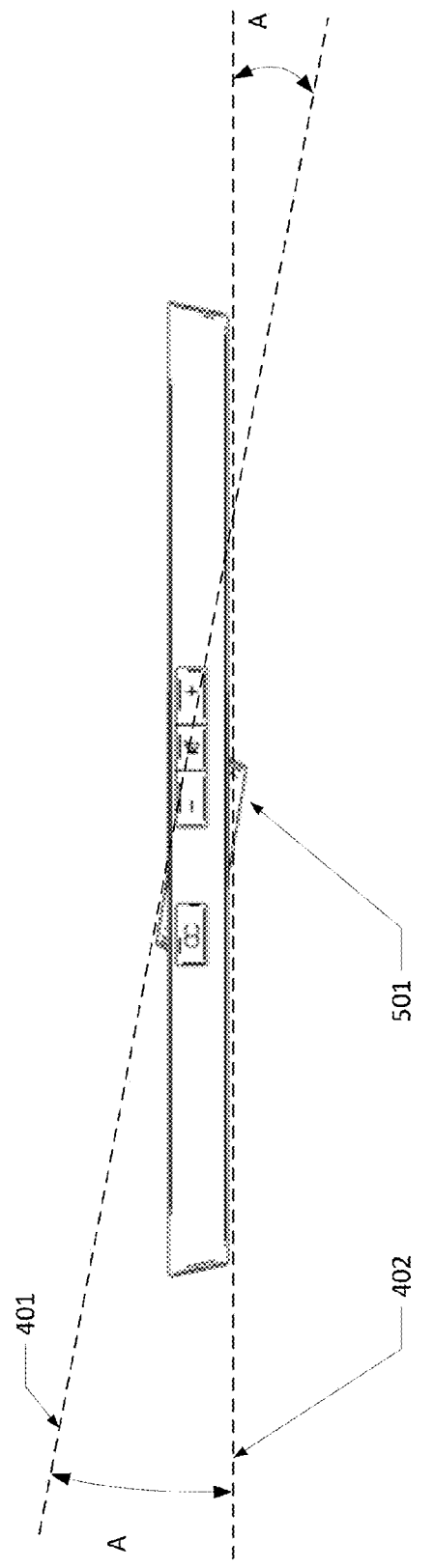

FIG. 5A used the front face to determine the plane 402. In some embodiments, the plane 402 may be measured using the rear surface of the device, as illustrated in FIG. 5B. This may be useful, for example, if the front face is curved.

The directional control pad 302 may include a portion visible in FIG. 3, and a base portion that lies underneath the visible portion in FIG. 3. The base portion of the directional control pad may house circuitry for detecting user presses on the directional input locations, and may be visible as protruding out of the rear surface of the device. As illustrated in FIG. 5A, a portion of the base portion 501 can be seen in that profile view. In some embodiments, the base portion 501 may form its own plane 502, which may also be offset by an angle B from the plane 402 described above. In some embodiments, the angles A and B may be equal, while in other embodiments they may be different.

Figure 5C:
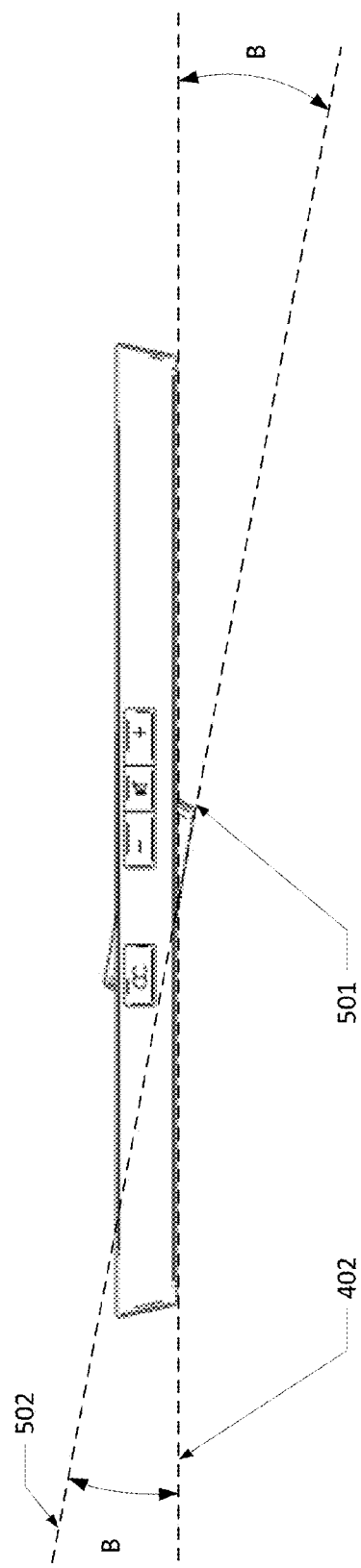

FIG. 5c illustrates the example plane 502 formed by the base portion 501, with respect to an embodiment of plane 402 using the rear surface of the device.

Figure 6A:
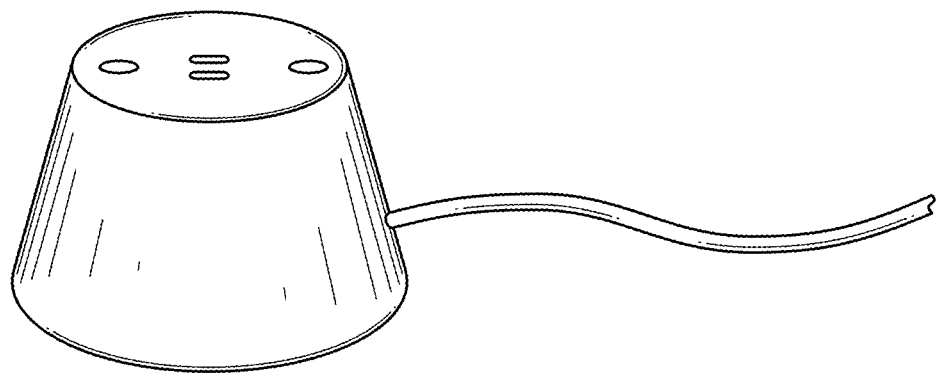
FIGS. 6A-C illustrate example configurations of a charging base and remote control device as described herein.
Figure 6B:
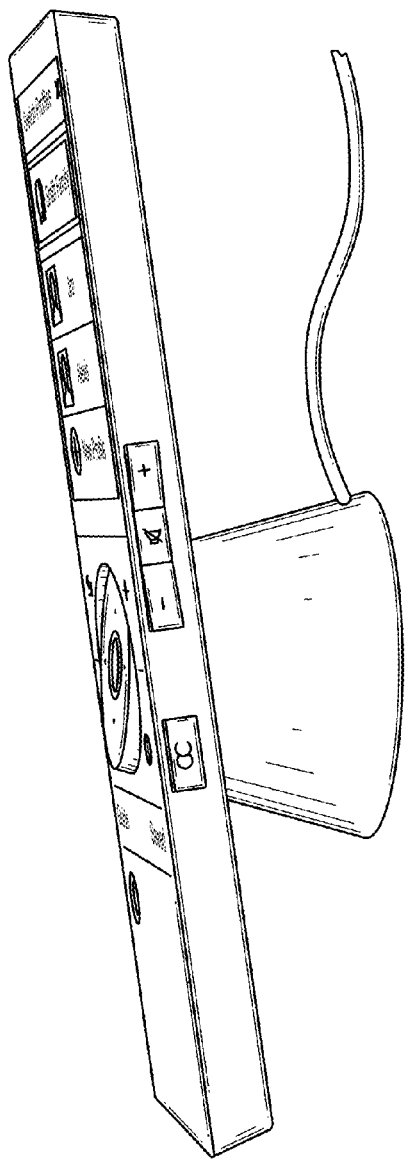

As noted above, the base portion 501 may be provided with a charging circuit for charging a battery of the device. FIG. 6A illustrates an example image of a charging base 600 that may be used with the remote 300 to charge the remote's battery. The base 600 may have a truncated conical shape, and its top surface may be flat, on which the directional control pad base portion may rest. The remote control may be weighted to have its center of gravity within the area of the directional control pad or its base portion, such as underneath the directional control pad, and the device may balance easily on the charging base 600 as illustrated in FIG. 6B. The charging base 600 may include a battery charging circuit, such as a wireless inducting charging circuit, that can charge the device's battery when the device is resting on the base. The charging circuit need not be wireless, and in some embodiments the charging base 600 and device 300 may include wire contacts 601 to allow electrical contact when the device 300 is resting on the base 600. In some embodiments, the charging base may also include one or more magnetic latches 602 to secure the device 300 to the base 600.

Figure 6C:
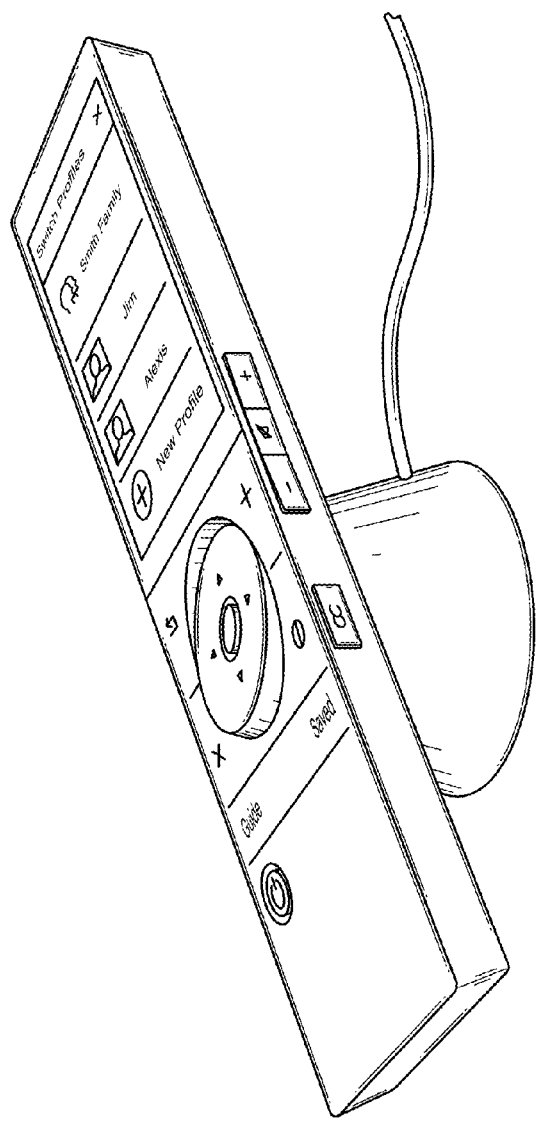

FIG. 6C illustrates another example view of the device 300 resting on the charging base 600. As evident from FIGS. 6A-C, when the device 300 rests on the base 600, the housing of the device and the plane 401 may rest at an angle that is offset from a horizontal surface on which the base 600 may rest.

Figure 7A:
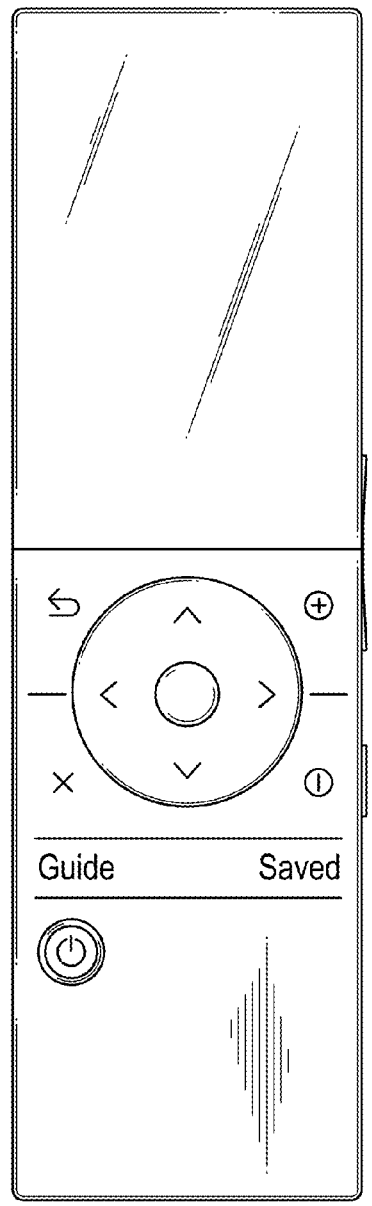
FIGS. 7A-B illustrate example remote control devices having alternative button configurations as described herein.
Figure 7B:
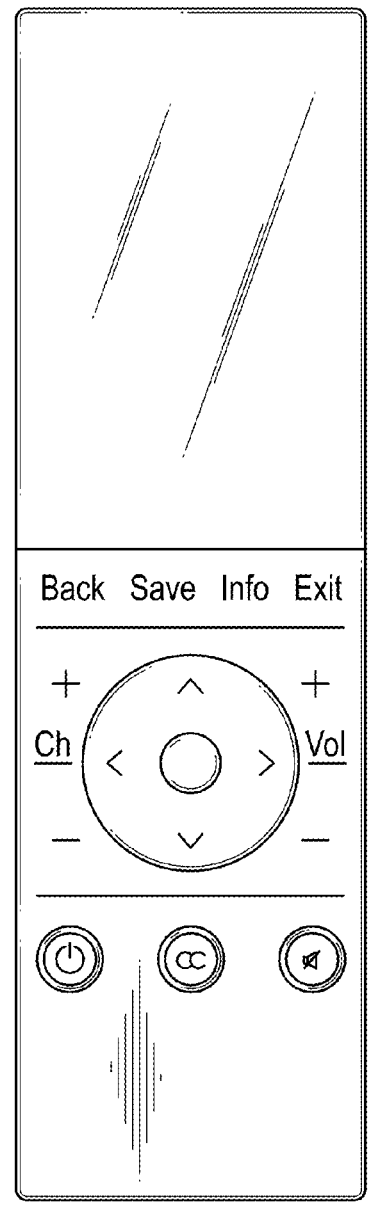

FIGS. 7A&B illustrate example remote control devices having alternative button configurations. The features used herein, such as the tilted directional control pad and the charging base, may be used with devices having these alternative button configuration, and any other desired button configuration.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

I claim:

1. An apparatus, comprising:
   a front face arranged in a first plane;
   a directional control pad in the front face, wherein the directional control pad has up, down, left and right directional input locations arranged, in a resting state, in a second plane at an offset angle with respect to the first plane; and
   a directional pad base portion that protrudes from a rear surface of the apparatus.

2. The apparatus of claim 1, wherein in a left or right side view of the apparatus, a first portion of the directional control pad having the up directional input location is obscured from view, while a second portion of the directional control pad having the down directional input location is visible.

3. The apparatus of claim 1, wherein a first portion of the directional control pad having the up directional input location is recessed in a rearward direction into the front face, while a second portion of the directional control pad having the down directional input location protrudes in a frontward direction from the front face.

4. The apparatus of claim 1, wherein the offset angle is 20 degrees.

5. The apparatus of claim 1, wherein the directional pad base portion protrudes from the rear surface of the apparatus at the offset angle.

6. The apparatus of claim 1, wherein the directional pad base portion comprises a first end underneath the up directional input location of the directional control pad, and a second end underneath the down directional input location of the directional control pad, and wherein the first end protrudes from the rear surface of the apparatus, while the second end is recessed into the rear surface of the apparatus.

7. The apparatus of claim 6, wherein in a front view of the apparatus, a center of gravity of the apparatus lies underneath the directional control pad.

8. The apparatus of claim 7, further comprising an inductive battery charging circuit in the directional pad base portion.

9. A system comprising the apparatus of claim 8, and a charging base having an upper surface configured to mate with the directional pad base portion.

10. The system of claim 9, wherein the upper surface of the charging base is arranged such that when the apparatus is placed on the charging base, the first plane rests at a tilted angle with respect to a surface on which the charging base rests.

11. The apparatus of claim 8, further comprising a magnetic lock in the directional pad base portion, configured to secure the apparatus against a charging base.

12. The apparatus of claim 1, wherein the offset angle is a user-adjustable offset angle.

13. The apparatus of claim 1, wherein the front face comprises a touch-sensitive display.

14. The apparatus of claim 1, wherein at least a portion of the front face extends between opposite edges of the apparatus.

15. A device, comprising:
a housing having front, rear, top, bottom, left and right sides;
a planar front surface having a plurality of user interface elements; and
a directional control pad in the planar front surface, wherein, in a resting state, a plane formed by upmost, bottommost, rightmost and leftmost portions of a front input surface of the directional control pad is tilted with respect to the planar front surface, and wherein a downmost direction portion of the front input surface of the directional control pad protrudes from the planar front surface, and wherein an upmost direction portion of the front input surface of the directional control pad is recessed into the planar front surface.

16. The device of claim 15, wherein a rear portion of the directional control pad protrudes from a rear surface of the device.

17. The device of claim 16, wherein the rear portion of the directional control pad protrudes from the rear surface of the device at an angle equal to an angle with which the plane is tilted with respect to the planar front surface.

18. The device of claim 15, wherein the directional control pad has a disk shape, and is visible from both front and rear views of the remote control device.

19. The device of claim 15, wherein at least a portion of the planar front surface extends between opposite edges of the device.

20. A device, comprising:
a housing having a top and a bottom;
a touch-sensitive display located at a top end of the housing; and
a disk-shaped directional control pad located below the touch-sensitive display, having a front portion that is tilted by at least twenty (20) degrees with respect to a plane of the touch-sensitive display; and
a disk-shaped rear portion corresponding to the directional control pad, wherein the rear portion is tilted by at least twenty (20) degrees with respect to a plane of a rear surface of the device.

21. The device of claim 20, wherein the front and rear portions of the directional control pad are parallel, and wherein the plane of the touch-sensitive display and the plane of the rear surface of the device are parallel.

* * * * *

UNITED STATES PATENT AND TRADEMARK OFFICE
CERTIFICATE OF CORRECTION

PATENT NO. : 9,467,730 B2  
APPLICATION NO. : 14/044482  
DATED : October 11, 2016  
INVENTOR(S) : Tom Loretan Page 1 of 1

It is certified that error appears in the above-identified patent and that said Letters Patent is hereby corrected as shown below:

In the Specification

Column 3, Detailed Description, Line 45:  
Please delete "HTMLS," and insert --HTML5,--

Column 8, Detailed Description, Line 1:  
Please delete "FIG. 5c" and insert --FIG. 5C--

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*